United States Patent
Yu et al.

(10) Patent No.: US 11,094,147 B2
(45) Date of Patent: Aug. 17, 2021

(54) SYSTEM AND METHOD FOR LOCATING WHEELS OF VEHICLE

(71) Applicant: ORANGE ELECTRONIC CO., LTD., Taichung (TW)

(72) Inventors: Hung-Chih Yu, Taichung (TW); Jiun-Yuan Tseng, Taichung (TW); Ming-Yung Huang, Taichung (TW)

(73) Assignee: ORANGE ELECTRONIC CO., LTD., Taichung (TW)

( * ) Notice: Subject to any disclaimer, the term of this patent is extended or adjusted under 35 U.S.C. 154(b) by 497 days.

(21) Appl. No.: 15/982,906

(22) Filed: May 17, 2018

(65) Prior Publication Data

US 2018/0374285 A1    Dec. 27, 2018

(30) Foreign Application Priority Data

Jun. 27, 2017    (TW) ................. 106121422

(51) Int. Cl.
   *G07C 5/08*    (2006.01)
   *B60C 23/04*    (2006.01)
   *G01P 3/481*    (2006.01)
   *G01D 5/245*    (2006.01)

(52) U.S. Cl.
   CPC ........ *G07C 5/0808* (2013.01); *B60C 23/0416* (2013.01); *B60C 23/0488* (2013.01);
   (Continued)

(58) Field of Classification Search
   CPC ................ G07C 5/0808; G01D 5/2457; B60C 23/0416; B60C 23/0488; B60C 23/0489;
   (Continued)

(56) References Cited

U.S. PATENT DOCUMENTS

| | | |
|---|---|---|
| 8,332,104 B2 | 12/2012 | Greer et al. |
| 8,981,920 B2 | 3/2015 | Kim |

(Continued)

FOREIGN PATENT DOCUMENTS

| | | |
|---|---|---|
| CN | 102666147 A | 9/2012 |
| CN | 102666147 A | 9/2012 |

(Continued)

OTHER PUBLICATIONS

Search Report received for TW Patent Application No. 106121422, dated Jan. 17, 2018, 2 pages (1 pages of English Translation and 1 pages of Original Document).

*Primary Examiner* — Rami Khatib
(74) *Attorney, Agent, or Firm* — Muncy, Geissler, Olds & Lowe, P.C.

(57) ABSTRACT

A system includes detecting devices secured respectively on wheels of a vehicle at different angular positions, sensors assigned respectively to the wheels and a control unit. Each detecting device emits a detecting signal when disposed at a first position and a second position different from the first position by a first angle. The first position where each detecting device emits the detecting signal during a current rotation cycle of the respective wheel differs from that during a next rotation cycle of the respective wheel by a second angle. The control device analyzes the detecting signals and tooth number signals from the sensors to associate the detecting devices respectively with the sensors.

20 Claims, 7 Drawing Sheets

(52) U.S. Cl.
CPC ....... *B60C 23/0489* (2013.01); *G01D 5/2457* (2013.01); *G01P 3/481* (2013.01); *B60Y 2400/301* (2013.01); *B60Y 2400/3032* (2013.01)

(58) Field of Classification Search
CPC .............. G01P 3/481; B60Y 2400/301; B60Y 2400/3032
See application file for complete search history.

(56) References Cited

U.S. PATENT DOCUMENTS

| | | | | |
|---|---|---|---|---|
| 2012/0259507 | A1* | 10/2012 | Fink | ................... B60C 23/0489 701/32.7 |
| 2014/0354421 | A1* | 12/2014 | Kosugi | ............... B60C 23/0488 340/447 |
| 2014/0371980 | A1 | 12/2014 | Sekizawa et al. | |
| 2014/0379291 | A1* | 12/2014 | Mori | ......................... G01P 3/44 702/138 |
| 2015/0174971 | A1* | 6/2015 | Kim | .................... B60C 23/0462 340/447 |
| 2017/0259627 | A1* | 9/2017 | Araya | .................... B60C 23/04 |

FOREIGN PATENT DOCUMENTS

| | | |
|---|---|---|
| CN | 103625225 A | 3/2014 |
| CN | 103625225 A | 3/2014 |
| CN | 104105607 A | 10/2014 |
| CN | 104105607 A | 10/2014 |
| EP | 2470381 B1 | 7/2012 |

\* cited by examiner

SYSTEM AND METHOD FOR LOCATING WHEELS OF VEHICLE

CROSS-REFERENCE TO RELATED APPLICATION

This application claims priority to Taiwanese Patent Application No. 106121422 filed on Jun. 27, 2017.

FIELD

The disclosure relates to a system and a method for locating wheels of a vehicle, more particularly to a system and a method for locating the wheels by associating detecting devices capable of detecting tire pressures of the wheels to wheel speed sensors.

BACKGROUND

U.S. Pat. No. 8,332,104 B2 discloses a conventional system for locating wheels of a vehicle including an electronic control unit (ECU) of the vehicle, a plurality of tire pressure monitoring (TPM) sensors, each associated with a respective wheel, and a plurality of wheel phase angle sensors, each associated with a respective wheel. For each wheel, the associated TPM sensor measures TPM sensor parameters of the wheel, and the associated wheel phase angle sensor detects a wheel phase angle at an one-measurement time point. Then, a radio frequency (RF) message that has an identification of the associated TPM sensor and the TPM sensor parameters is transmitted to the ECU after a predetermined time delay from the one-measurement time point. The ECU is operable to execute instructions of correlating a location of the wheel with a location of an antilock brake system (ABS) sensor based on ABS data at the one-measurement time point, determining the location of the wheel based on the correlation, and associating the TPM sensor parameters with the determined location of the wheel. This patent also discloses that the wheel phase angle sensor may detect the wheel phase angle multiple times. However, the ECU may receive more than one RF message at a time, and this causes difficulty in determining the location of the wheel. Further, as the speed of the vehicle increases, aliasing of the RF messages may occur and adversely affect the determination of the location of the wheel.

SUMMARY

Therefore, an object of the disclosure is to provide a method and a system for locating wheels of a vehicle capable of alleviating at least the above drawbacks.

According to one aspect of the disclosure, a system for locating wheels of a vehicle is provided. Each of the wheels includes a toothed ring. The toothed rings of the wheels have respective reference teeth that are disposed respectively at different angular positions in a common coordinate system of the wheels. The system includes a plurality of detecting devices, a plurality of wheel speed sensors, and a control device. The detecting devices are secured respectively on the wheels at respective different angular positions in the common coordinate system so that each of the detecting devices is co-rotatable with the respective one of the wheels. Each of the detecting devices, during a rotation cycle of the respective one of the wheels, emits a detecting signal when disposed at a first reference position that is defined relative to a reference line and emits the detecting signal when disposed at a second reference position that is defined relative to the reference line and that differs from the first reference position by a first angle. The wheel speed sensors are assigned respectively to the wheels. Each of the wheel speed sensors senses the toothed ring of the respective one of the wheels and emits a tooth number signal that indicates an ordinal number of a tooth of the toothed ring that is currently sensed by the wheel speed sensor counting from the reference tooth of the toothed ring of the respective one of the wheels. The control device is communicatively coupled to the detecting devices and the wheel speed sensors for receiving the detecting signals from the detecting devices and the tooth number signals from the wheel speed sensors.

For each of the detecting devices, the first reference position where the detecting device emits the detecting signal during a current rotation cycle of the respective one of the wheels differs from the first reference position where the detecting device emits the detecting signal during a next rotation cycle of the respective one of the wheels by a second angle.

The control device locates the wheels by analyzing the detecting signals and the tooth number signals to associate the detecting devices respectively with the wheel speed sensors, and for each of the detecting devices, identifying, as one of the wheels to which the detecting device is secured, one of the wheels to which one of the wheel speed sensors the detecting device is associated with is assigned.

According to another aspect of the disclosure, a method for locating wheels of a vehicle is provided. Each of the wheels includes a toothed ring. The toothed rings of the wheels have respective reference teeth that are disposed respectively at different angular positions in a common coordinate system. The method is to be implemented by a system. The system includes a plurality of detecting devices, a plurality of wheel speed sensors and a control device. The detecting devices are secured respectively on the wheels at respective different angular positions in the common coordinate system so that each of the detecting devices is co-rotatable with the respective one of the wheels. The wheel speed sensors are assigned respectively to the wheels. The control device is communicatively coupled to the detecting devices and the wheel speed sensors. The method includes steps of:

by each of the detecting devices, during a rotation cycle of the respective one of the wheels, emitting a detecting signal when the detecting device is disposed at a first reference position that is defined relative to a reference line and emitting the detecting signal when the detecting device is disposed at a second reference position that is defined relative to the reference line and that differs from the first reference position by a first angle, the first reference position where the detecting device emits the detecting signal during a current rotation cycle of the respective one of the wheels differs from the first reference position where the detecting device emits the detecting signal during a next rotation cycle of the respective one of the wheels by a second angle;

sensing, by each of the wheel speed sensors, the toothed ring of the respective one of the wheels;

emitting, by each of the wheel speed sensors, a tooth number signal that indicates an ordinal number of a tooth of the toothed ring that is currently sensed by the wheel speed sensor counting from the reference tooth of the toothed ring of the respective one of the wheels;

receiving, by the control device, the detecting signals respectively from the detecting devices and the tooth number signals respectively from the wheel speed sensors;

analyzing, by the control device, the detecting signals and the tooth number signals to associate the detecting devices respectively with the wheel speed sensors; and for each of the detecting devices, identifying, by the control device, one of the wheels, to which one of the wheel speed sensors the detecting device is associated with is assigned, as one of the wheels to which the detecting device is secured.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics.

Figure 1:
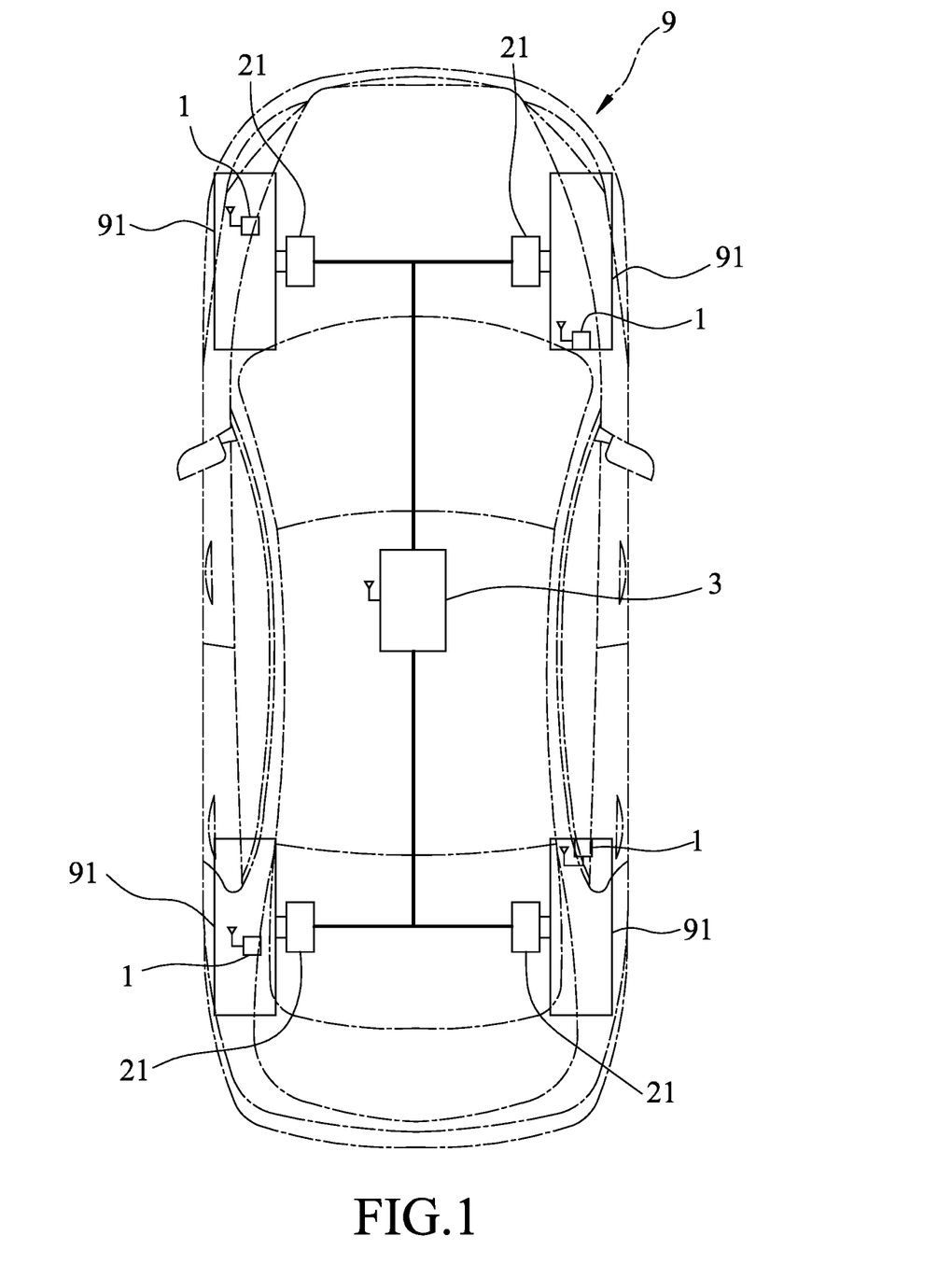
FIG. 1 is schematic view of a vehicle on which a system for locating wheels of the vehicle according to one embodiment of this disclosure is mounted.
Figure 2:
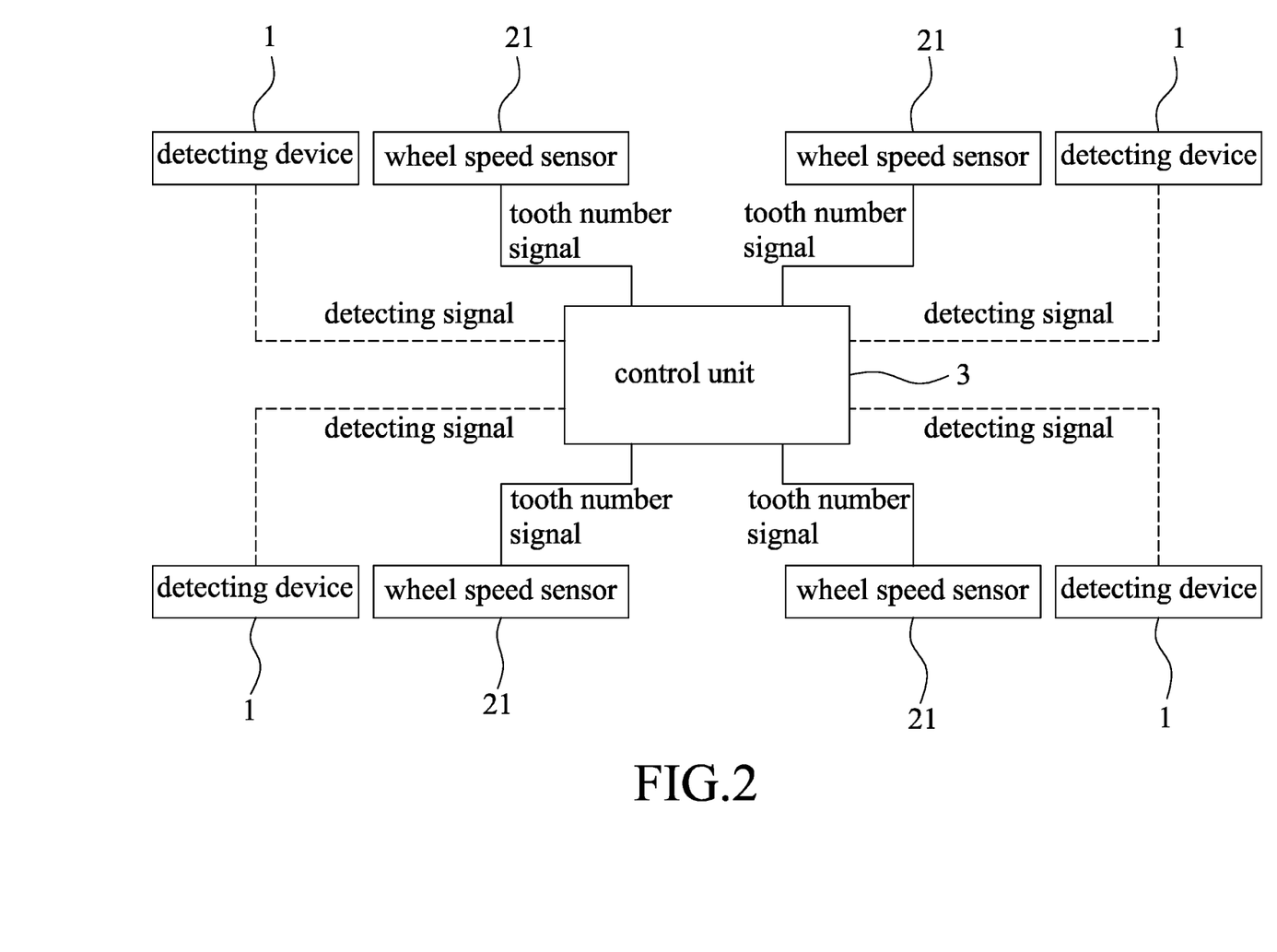
FIG. 2 is a schematic block diagram illustrating the system according to one embodiment of this disclosure.
Figure 3:
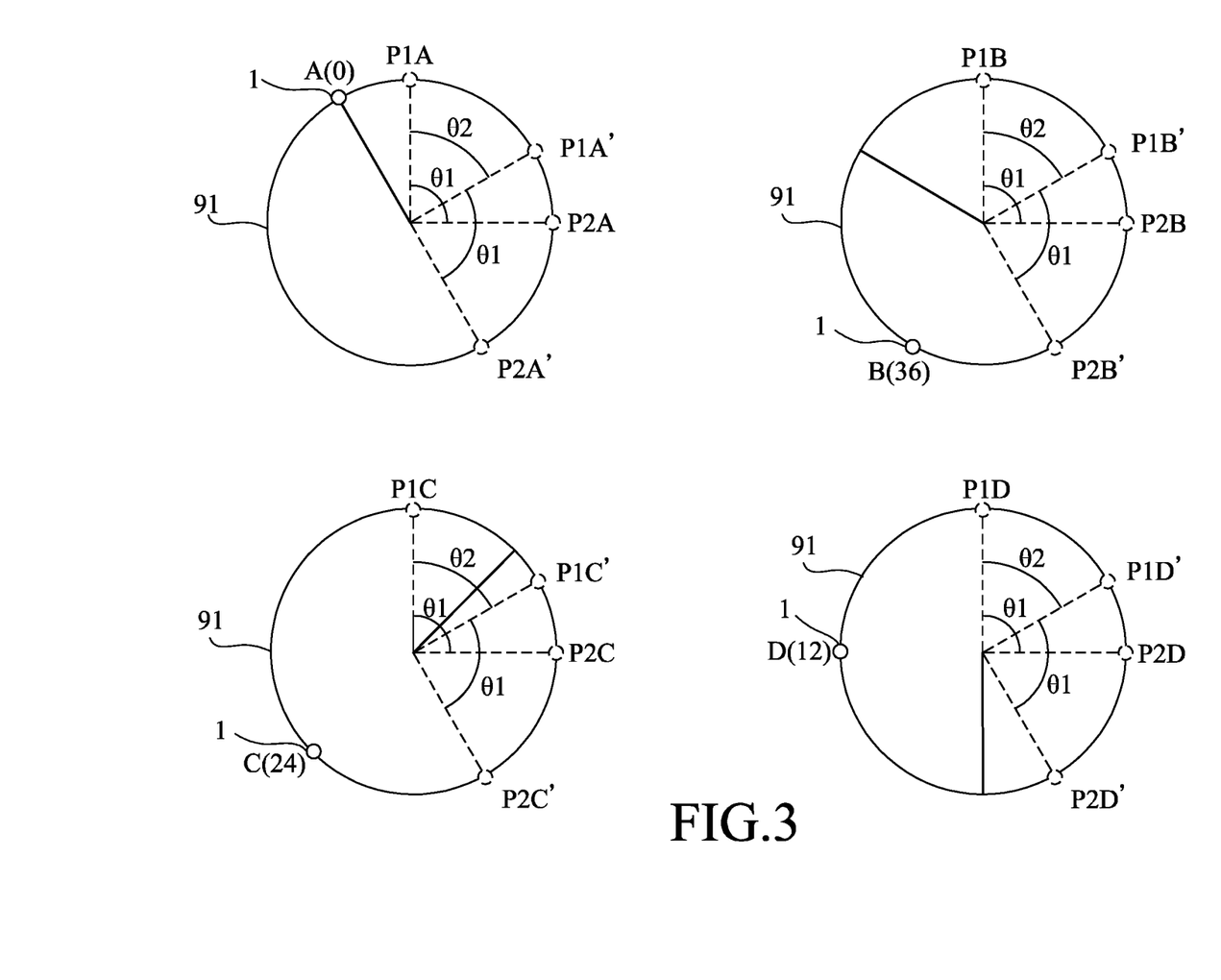
FIG. 3 is a schematic diagram illustrating arrangement of detecting devices of the system and a plurality of reference positions where the detecting devices of the system emit detecting signals according one embodiment of this disclosure.

Referring to FIGS. 1 and 2, a system for locating wheels of a vehicle according to one embodiment of the disclosure is mounted to a vehicle 9 including four wheels 91. Each of the wheels 91 includes a toothed ring. The toothed rings of the wheels 91 have respective reference teeth that are disposed respectively at different angular positions in a coordinate system common to all the wheels 91 (hereinafter also referred to as "the common coordinate system of the wheels 91"). Herein, the common coordinate system is defined by the wheels 91 and is therefore co-rotatable with the wheel 91. For example, each toothed ring includes forty-eight teeth with zero-based numbering, and the reference tooth thereof is the zeroth tooth. As shown in FIG. 3, the positions of the reference teeth of the respective toothed rings are expressed by four solid bold lines disposed at different angular positions in the common coordinate system of the wheels 91. Since the feature of this disclosure does not reside in the specific structure of the toothed rings, which is commonly known by a person skilled in the art, details of the same are omitted for the sake of brevity.

The system includes a plurality of detecting devices 1, a plurality of wheel speed sensors 21 and a control device 3. A number of the detecting devices 1 and a number of the wheel speed sensors 21 are identical to a number of the wheels 91. In this embodiment, the number of the detecting devices 1 and the number of the wheel speed sensors 21 are both four, and the present disclosure is not limited in this respect.

The detecting devices 1 are assigned four different device identifications (A, B, C and D), respectively, and are secured respectively on the wheels 91 at respective different angular positions in the common coordinate system. Note that each device identification (A, B, C and D) is unique and is exclusive to a respective one of the detecting devices 1 to which the device identification (A, B, C and D) is assigned. Each of the detecting devices 1 is co-rotatable with the respective one of the wheels 91. As shown in FIG. 3, for each of the detecting devices 1, the angular position thereof in the common coordinate system is represented by a small circle enclosed by a solid line. A number in brackets nearby the device identification indicates an ordinal number of one of the teeth of the toothed ring that corresponds to the angular position of the detecting device 1. For example, for the detecting device 1 with the device identification of B, the angular position thereof corresponds to the $36^{th}$ tooth of the respective toothed ring.

Figure 4:
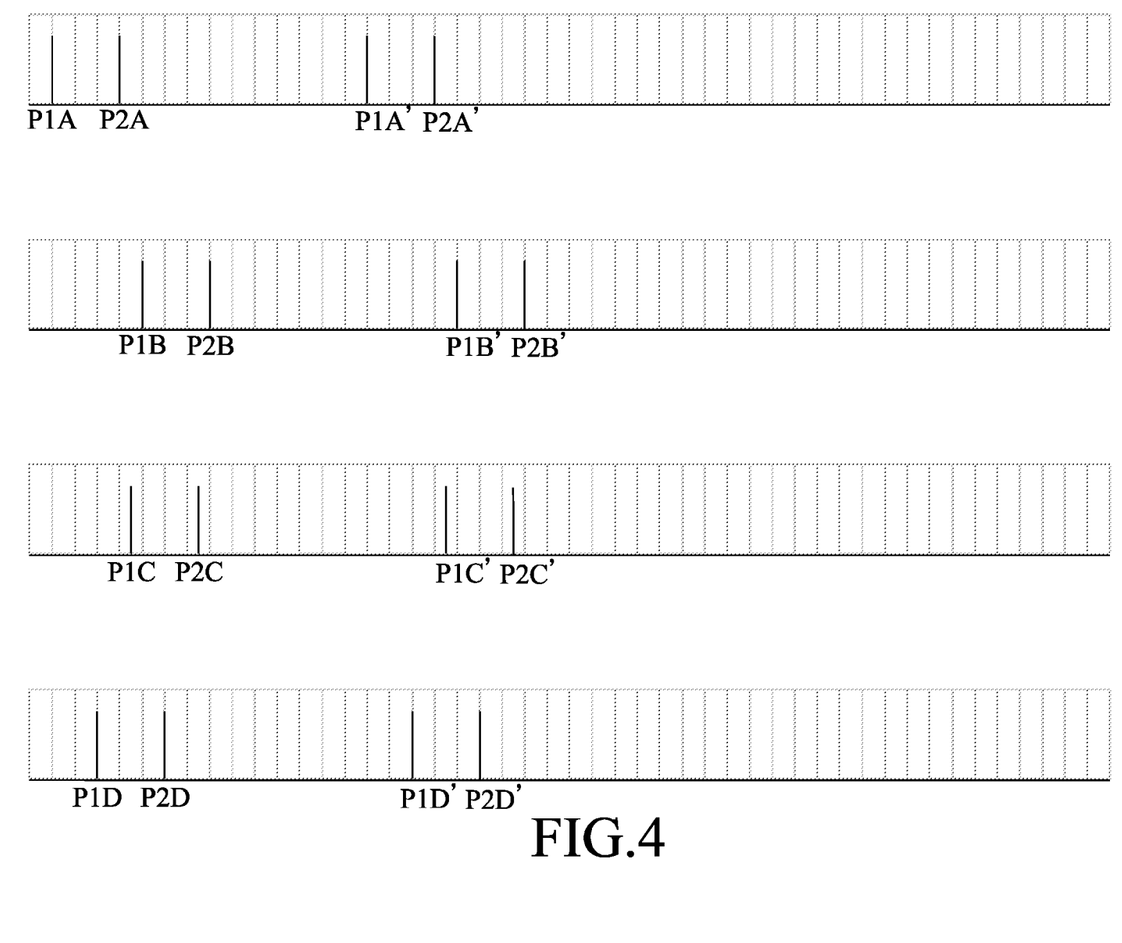
FIG. 4 illustrates the detecting signals emitted respectively by the detecting devices of FIG. 3.

Further referring to FIG. 4, each of the detecting devices 1, during a rotation cycle of the respective one of the wheels 91, emits a detecting signal when disposed at a first reference position (P1A, P1B, P1C and P1D) that is defined relative to a reference line, and emits the detecting signal again when disposed at a second reference position (P2A, P2B, P2C and P2D) that is defined relative to the reference line and that differs from the first reference position (P1A, P1B, P1C and P1D) by a first angle ($\theta$1). In particular, the first reference position (P1A, P1B, P1C and P1D) has a fixed angular relationship with the reference line in a same rotation cycle of the wheels 91, and the second reference position (P2A, P2B, P2C and P2D) has a different, fixed angular relationship with the reference line in a same rotation cycle of the wheels 91. Note that the angular positions of any two of the detecting devices 1 in the common coordinate system differ from each other by an angle that is different from the first angle ($\theta$1). In FIG. 4, the horizontal axis represents a degree of rotation of the wheel 91 on an axle bearing, and the vertical axis represents an amplitude of the detecting signal. As can be seen, each of the detecting signals is a pulse signal and is represented by an upright bold line in FIG. 4. Further, each grid defined by two adjacent dotted lines in FIG. represents thirty degrees. For example, the determination that the detecting device 1 is disposed at the first reference position (P1A, P1B, P1C and P1D) or the second reference position (P2A, P2B, P2C and P2D) is made using a gyroscope or an accelerometer, and the reference line is, e.g., a geoid-based vertical line (a line vertical to the geoid surface).

For each of the detecting devices 1, the detecting signal emitted thereby includes the device identification (A, B, C and D) of the detecting device 1. In this embodiment, each of the detecting devices 1 includes a tire pressure detector for detecting a tire pressure of the respective one of the wheels 91 on which the detecting device 1 is secured, and the detecting signal emitted by the detecting device 1 further includes data of the tire pressure.

The wheel speed sensors 21 are assigned respectively to the wheels 91. Each of the wheel speed sensors 21 senses the toothed ring of the respective one of the wheels 91 and emits a tooth number signal. For each of the wheel speed sensors 21, the tooth number signal emitted thereby indicates an ordinal number of a tooth of the corresponding toothed ring that is currently sensed by the wheel speed sensor 21 counting from the reference tooth of the corresponding toothed ring. As an example, the wheel speed sensors 21 are included in an anti-lock braking system of the vehicle 9.

The control device 3 is communicatively coupled to the detecting devices 1 and the wheel speed sensors 21 for receiving the detecting signals from the detecting devices 1 and the tooth number signals from the wheel speed sensors 21. In this embodiment, the control device 3 is electrically and physically connected to the wheel speed sensors 21 to receive the tooth number signals, and is wirelessly connected to the detecting devices 1 to wirelessly receive the detecting signals from the detecting devices 1. The control device 3 analyzes the detecting signals and the tooth number signals to associate the detecting devices 1 respectively with the wheel speed sensors 21 to thereby locate the wheels 4. In this embodiment, the control device 3 is a computing device, such as an electronic control unit (ECU) of the vehicle 9. The term "computing device" may refer to any device or portion of a device that processes electronic data from registers and/or memory to transform that electronic data into other electronic data. For example, in other embodiments, the control device 3 may include, but not limited to, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), etc.

Figure 5:
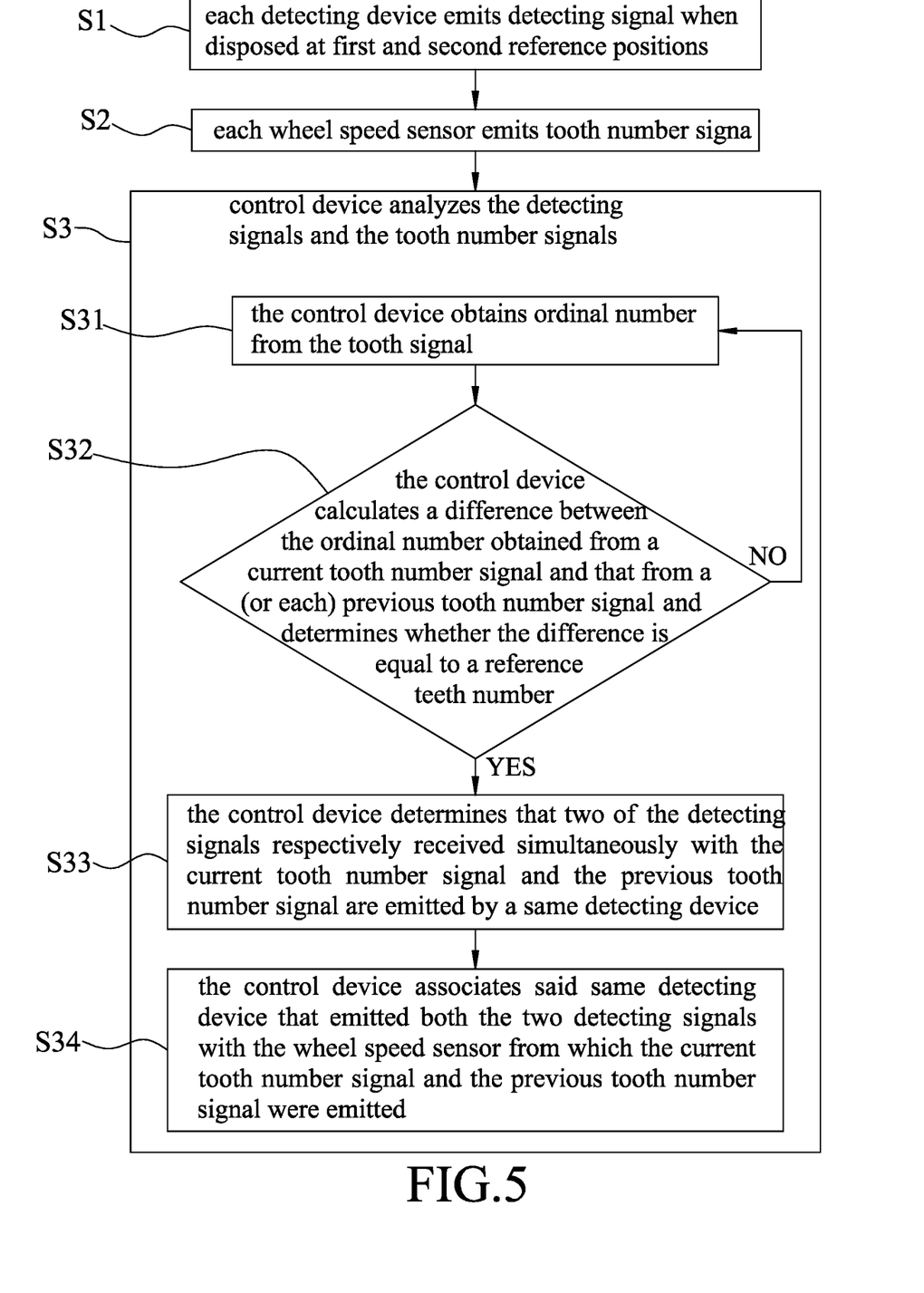
FIG. 5 is a flowchart of a method for locating wheels of a vehicle according to one embodiment of this disclosure.

Further referring to FIG. 5, a method for locating wheels 91 of the vehicle 9 to be implemented by a system according to one embodiment of this disclosure is shown, and the method includes the following steps.

In step S1, each of the detecting devices 1, during a rotation cycle of the respective one of the wheels 91, emits a detecting signal when the detecting device 1 is disposed at the first reference position (P1A, P1B, P1C and P1D), and emits the detecting signal again when the detecting device 1 is disposed at the second reference position (P2A, P2B, P2C and P2D) that differs from the first reference position (P1A, P1B, P1C and P1D) by the first angle (θ1). For each of the detecting devices 1, the first reference position (P1A, P1B, P1C and P1D) where the detecting device 1 emits the detecting signal during a current rotation cycle of the respective one of the wheels 91 differs from the first reference position (P1A', P1B', P1C' and P1D') where the detecting device 1 emits the detecting signal during a next rotation cycle of the respective one of the wheels 91 by a second angle (θ2). Similarly, each of the detecting devices 1, during the next rotation cycle of the respective one of the wheels 91, emits the detecting signal when the detecting device 1 is disposed at the first reference position (P1A', P1B', P1C' and P1D'), and emits the detecting signal again when the detecting device 1 is disposed at the second reference position (P2A', P2B', P2C' and P2D') that differs from the first reference position (P1A', P1B', P1C' and P1D') by the first angle (θ1). Note that in this embodiment, the first angle (θ1) is different from the second angle (θ2). The first and second angles (θ1, θ2) can be varied as desired. In other embodiments, the first angle (θ1) may vary in different rotation cycles of the wheels 91.

In step S2, each of the wheel speed sensors 21 continuously emits the tooth number signal by sensing the toothed ring of the corresponding one of the wheels 91.

It should be noted that steps S1 and S2 may be implemented simultaneously.

In step S3, the control device 3 analyzes the detecting signals and the tooth number signals to associate the detecting devices 1 respectively with the wheel speed sensors 21. For each of the detecting devices 1, the control device 3 identifies, as the wheel to which the detecting device 1 is secured, one of the wheels 91 to which one of the wheel speed sensors 21 the detecting device 1 is associated with is assigned. The details of how the control device 3 associates the detecting devices 1 respectively with the wheel speed sensors 21 will be described below in sub-steps S31 to S34 of step S3. Note that sub-steps S31 to S34 are performed with respect to each of the wheel speed sensors 21, and therefore the description thereof will be provided with respect to a single one of the wheel speed sensors 21 for the sake of clarity and brevity.

In sub-step S31, upon receiving a detecting signal, the control device 3 obtains the ordinal number from a current one of the tooth number signals that is currently received from the wheel speed sensor 21.

In sub-step S32, the control device 3 calculates a difference between the ordinal number obtained from the current one of the tooth number signals and the ordinal number obtained from a previous one of the tooth number signals that is received from the wheel speed sensor 21 prior to the current one of the tooth number signals, and determines whether the difference is equal to a reference teeth number. When affirmative, the flow of the method goes to sub-step S33; otherwise, sub-steps S31 and S32 are repeated. Note that how the reference teeth number is obtained will be described in an example referring to Table 1 below. In sub-step S33, the control device 3 determines that two of the detecting signals, which were respectively received simultaneously with the current one of the tooth number signals and the previous one of the tooth number signals, were emitted by a same one of the detecting devices 1. After sub-step S33, in sub-step S34, the control device 3 associates said one of the detecting devices 1 that emitted both the two of the detecting signals with the wheel speed sensor 21 from which the current tooth number signal the previous tooth number signal are emitted.

TABLE 1

| P1A | P1D | P2A | P1C | P1B | P2D | P2C | P2B | P1A' | ... |
|---|---|---|---|---|---|---|---|---|---|
| 4 | 12 | 16 | 18 | 20 | 24 | 30 | 32 | 12 | ... |
| 40 | 0 | 4 | 6 | 8 | 12 | 18 | 20 | 8 | ... |
| 28 | 36 | 40 | 42 | 44 | 48(0) | 6 | 8 | 44 | ... |
| 16 | 24 | 28 | 30 | 32 | 36 | 42 | 44 | 32 | ... |

Table 1 shows some examples of the ordinal numbers of the tooth number signals obtained by the control device 3 in step S31. Each column in Table 1 contains the ordinal numbers obtained by the control device 3 respectively from the tooth number signals that are received at the same time from the four wheel speed sensors 21, respectively. In particular, the tooth number signals, from which the ordinal numbers in the same column are obtained, are received simultaneously with one detecting signal. For example, the third column indicates that, upon the detecting signal emitted by the detecting device 1 that is assigned the device identification (A) is received by the control device 3 when said detecting device 1 is disposed at the second reference position (P2A), the ordinal numbers obtained from the wheel speed sensors 21 are respectively 16, 4, 40 and 28. That is to say, the control device 3 obtains four ordinal numbers from the tooth number signals respectively received from the four wheel speed sensors 21 upon receipt of the detecting signal.

Each row in Table 1 contains the ordinal numbers obtained by the control device 3 from the tooth number signals that are received from the same one of the wheel speed sensors 21 upon receipt of the detecting signals from any detecting device (i.e., the four detecting devices 1) at different times. In the example that each of the toothed rings of the wheels 91 includes forty-eight teeth and the first angle (θ1) equals 90 degrees, the reference teeth number is calculated by first obtaining a quotient of a product of the first angle (θ1) and the total number of teeth of each toothed ring divided by 360

$$\left(\text{i.e., } \frac{90 \times 48}{360} = 12\right).$$

The reference teeth number is equal to the quotient (i.e., 12) when the ordinal number (e.g., 16) from the current tooth number signal is smaller than the total number of teeth by at least the quotient (i.e., 48−16>12), and is equal to a difference of the total number of teeth of each toothed ring minus the quotient (i.e., 48−12=36) when otherwise.

Take the first row in Table 1 as an example for illustrating sub-steps S32 to S34, the control device 3 calculates, for the wheel speed sensor 21 that emitted the tooth number signals from which the ordinal numbers in the first row are obtained, a difference between the ordinal number (i.e., 4) obtained from a first tooth number signal and the ordinal number (i.e., 12) obtained from a second tooth number signal that is received after the first tooth number signal. It should be noted that, at the time point when the second tooth number signal is received, the second tooth number signal is treated as the current tooth number signal, and the first tooth number signal is treated as the previous tooth number signal. Then, the control device 3 determines whether the difference is equal to the reference teeth number. In this example, the current ordinal number (i.e., 12) is smaller than the total number of teeth (i.e., 48) by at least the quotient (i.e., 12), and thus the reference teeth number is equal to the quotient (i.e., 12). Since the calculated difference (i.e., 12−4=8) is not equal to the reference teeth number (i.e., 12), the flow of the method returns to sub-step S31 to obtain the ordinal number (e.g., 16) from a third tooth number signal, and when the flow goes to sub-step S32 again, the control device 3 calculates a difference between each previous ordinal number (e.g., 4 and 12) and the ordinal number (e.g., 16) obtained from of the third tooth number signal that is treated as the current tooth number signal at this time point, and determines whether the difference (i.e., 16−12=4 or 16−4=12) is equal to the reference teeth number (i.e., 12). Since it is determined that the difference between the ordinal numbers obtained respectively from the first and third tooth number signals is equal to the reference teeth number, the control device 3 determines that two of the detecting signals, which were received simultaneously with the first tooth number signal and the third tooth number signal and which both include the device identification (A), were emitted by a same one of the detecting devices 1 which is assigned the device identification (A). Then, the control device 3 associates said detecting device 1 that is assigned the device identification (A) and that emitted both the two of the detecting signals with the wheel speed sensor 21 that emitted the first and third tooth number signals (i.e., the wheel speed sensor 21 that emitted the tooth number signals from which the ordinal numbers in the first row are obtained in this example). Similarly, the control device 3 associates the remaining three wheel speed sensors 21 respectively with the respective detecting devices 1 assigned the device identifications (B, C, D) using the same approach.

Figure 6:
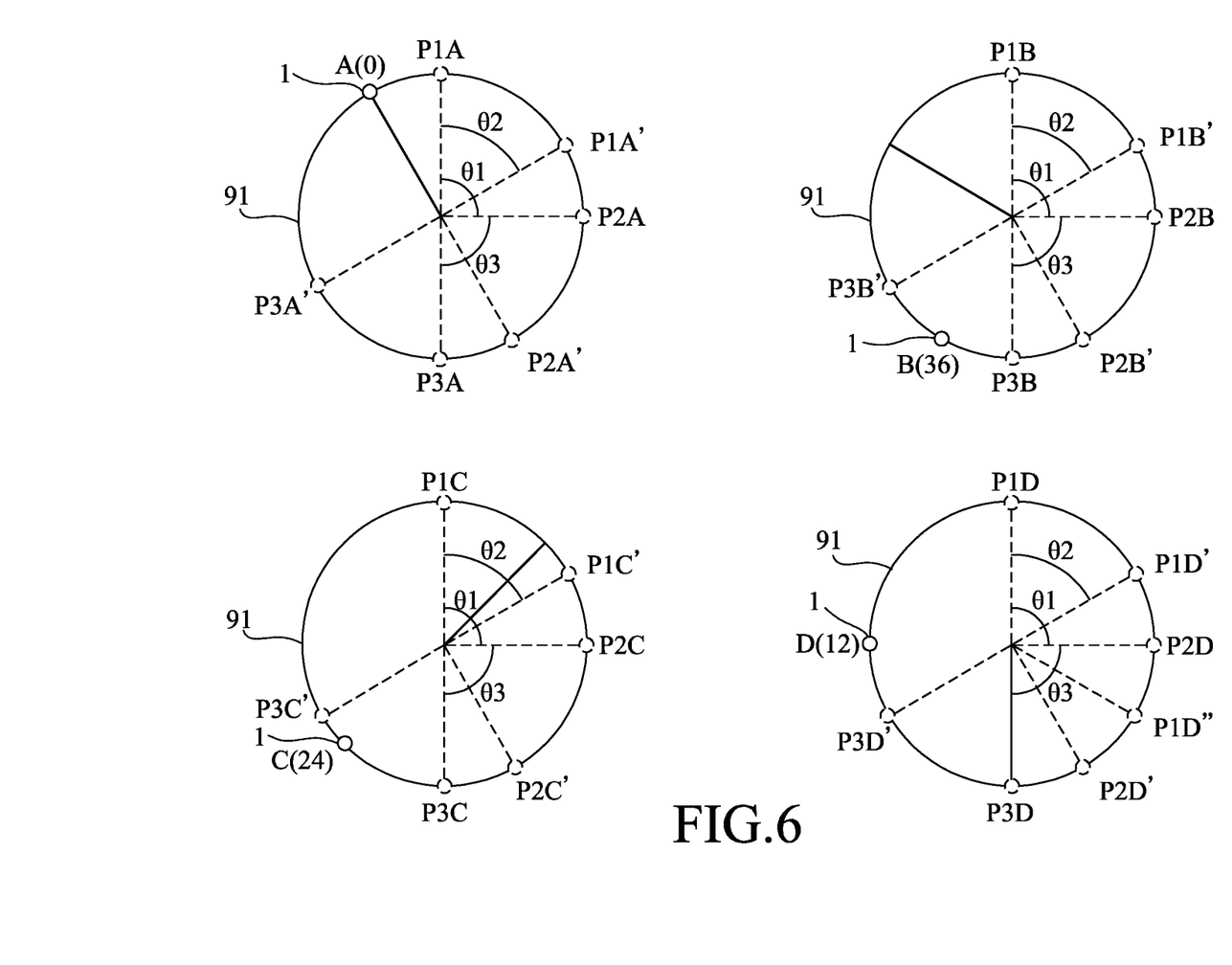
FIG. 6 is a schematic view similar to FIG. 3, illustrating more reference positions where the detecting devices emit the detecting signals according one embodiment of this disclosure.
Figure 7:
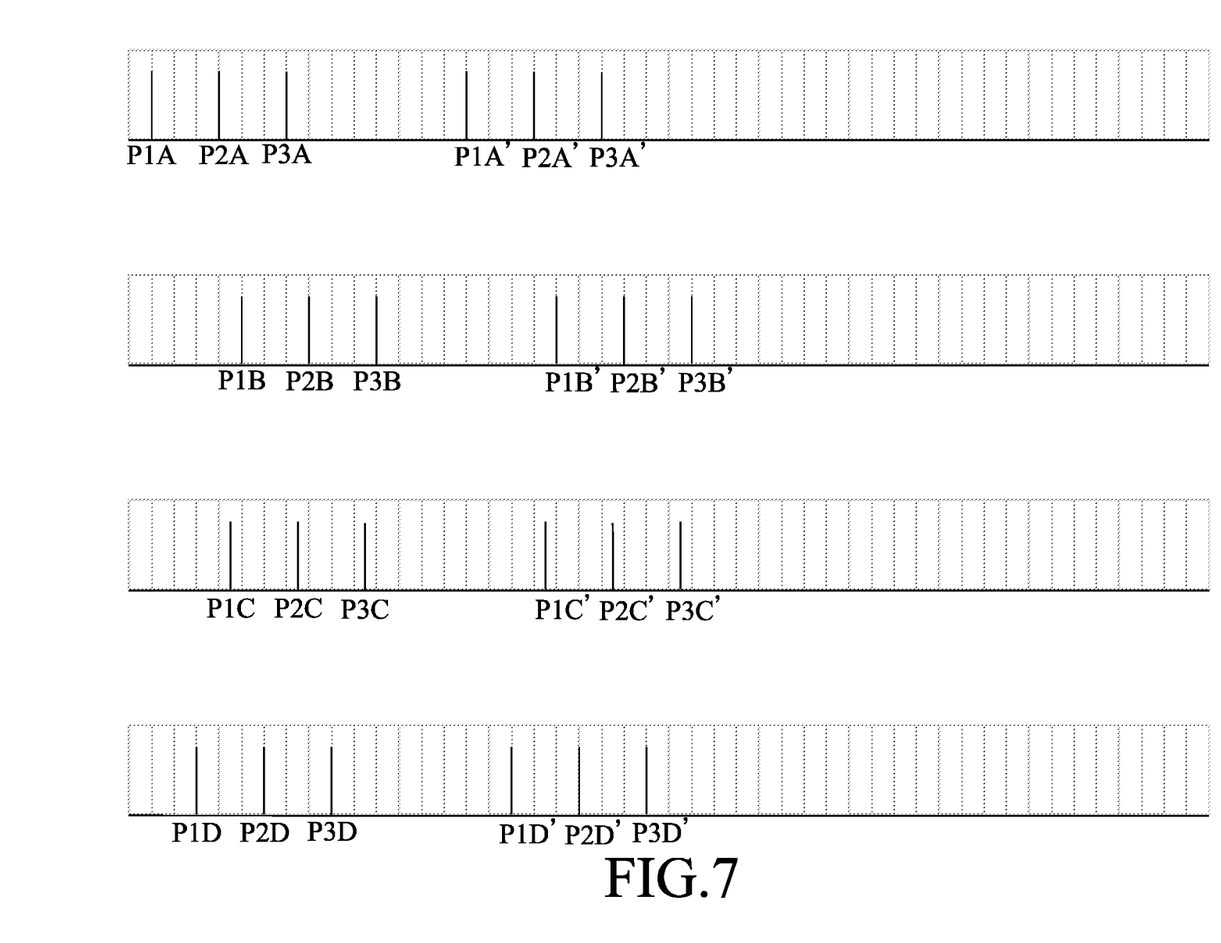
FIG. 7 illustrates the detecting signals emitted respectively by the detecting devices of FIG. 6.

Referring to FIGS. 6 and 7, in another embodiment of this disclosure, each of the detecting devices 1 further emits the detecting signal when disposed at a third reference position (P3A, P3B, P3C and P3D) that is defined relative to the reference line (i.e., that has a fixed angular relationship with the reference line in this embodiment) during the rotation cycle of the respective one of the wheels 91. The third reference position is different from the second reference position (P2A, P2B, P2C and P2D) by a third angle (θ3). In this embodiment, the control device 3 is capable of obtaining another reference teeth number based on the third angle (θ3) to thereby associate the detecting devices 1 respectively with the wheel speed sensors 21 further according to the third angle (θ3). Since how the control device 3 associates the detecting devices 1 with the wheel speed sensors 21 are identical to the embodiment illustrated in FIGS. 4-6, the details of the same are omitted for the sake of brevity. Note that the third angle (θ3) is identical to the first angle (θ1) and is equal to 90 degrees in this embodiment, and the present disclosure is not limited to this embodiment.

To sum up, in the present disclosure, the detecting devices 1 are secured respectively on the wheels 91 at respective different angular positions in the common coordinate system of the wheels 91, and the positions of the reference teeth of the respective toothed rings are disposed at different angular positions in the common coordinate system of the wheels 91. Further, for each of the detecting devices 1, the first reference position where the detecting device 1 emits the detecting signal during the current rotation cycle of the respective one of the wheels 91 differs from the first reference position where the detecting device 1 emits the detecting signal during a next rotation cycle of said wheel 91 by the second angle (θ2). It should be noted that the control device 3 may fail to receive the detecting signal emitted by the detecting device 1 at a specific position because the detecting signal is blocked or interfered with. However, the configuration of the detecting device 1 emitting the detecting signal in the current rotation cycle at two or three reference positions that are different respectively from the reference positions in the next rotation cycle can prevent the control device 3 from continuously failing to receive the detecting signal. Accordingly, the detecting devices 1 pass through the same reference position at different moments in time, and thus the detecting signals received by the control device 3 are staggered with each other, so that the control device 3 receives only one detecting signal at a time. By virtue of the abovementioned features, the probability of aliasing of the detecting signals received by the control device 3 can be decreased and a relatively good accuracy of identification of the wheels 91 can be obtained.

In the description above, for the purposes of explanation, numerous specific details have been set forth in order to provide a thorough understanding of the embodiment(s). It will be apparent, however, to one skilled in the art, that one or more other embodiments maybe practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A system for locating wheels of a vehicle, each of the wheels including a toothed ring, the toothed rings of the wheels having respective reference teeth that are disposed respectively at different angular positions in a common coordinate system of the wheels, said system comprising:
    a plurality of detecting devices secured respectively on the wheels at respective different angular positions in the common coordinate system so that each of said detecting devices is co-rotatable with the respective one of the wheels, wherein each of said detecting devices, during a rotation cycle of the respective one of the wheels, emits a detecting signal when disposed at a first reference position that is defined relative to a reference line and emits the detecting signal when disposed at a second reference position that is defined relative to the reference line and that differs from the first reference position by a first angle;
    a plurality of wheel speed sensors assigned respectively to the wheels, each of said wheel speed sensors sensing the toothed ring of the respective one of the wheels and emitting a tooth number signal that indicates an ordinal number of a tooth of the toothed ring that is currently sensed by said wheel speed sensor counting from the reference tooth of the toothed ring of the respective one of the wheels; and
    a control device communicatively coupled to said detecting devices and said wheel speed sensors for receiving the detecting signals from said detecting devices and the tooth number signals from said wheel speed sensors,
    wherein, for each of said detecting devices, the first reference position where said detecting device emits the detecting signal during a current rotation cycle of the respective one of the wheels differs from the first reference position where said detecting device emits the detecting signal during a next rotation cycle of the respective one of the wheels by a second angle
    wherein said control device locates the wheels by
        analyzing the detecting signals and the tooth number signals to associate said detecting devices respectively with said wheel speed sensors, and
        for each of said detecting devices, identifying, as one of the wheels to which said detecting device is secured, one of the wheels to which one of said wheel speed sensors said detecting device is associated with is assigned.

2. The system as claimed in claim 1, wherein, for each of said wheel speed sensors, said control device associates one of said detecting devices with said wheel speed sensor by:
    upon receiving each of the detecting signals, obtaining the ordinal number from a current one of the tooth number signals that is currently received from said wheel speed sensor;
    calculating a difference between the ordinal number obtained from the current one of the tooth number signals and the ordinal number obtained from a previous one of the tooth number signals that is received from said wheel speed sensor prior to the current one of the tooth number signals;
    when the difference is equal to a reference teeth number, determining that two of the detecting signals, which were respectively received simultaneously with the current one of the tooth number signals and the previous one of the tooth number signals, were emitted by a same one of said detecting devices; and
    associating said one of said detecting devices that emitted both said two of the detecting signals with said wheel speed sensor.

3. The system as claimed in claim 2, wherein the reference teeth number is equal to a quotient of a product of the first angle and a total number of teeth of the toothed ring divided by 360 when the ordinal number obtained from the current one of the tooth number signals is smaller than the total number of teeth by at least the quotient, and is equal to a difference of the total number of teeth minus the quotient when otherwise.

4. The system as claimed in claim 2, wherein each of said detecting devices further emits the detecting signal when disposed at a third reference position that is defined relative to the reference line during the rotation cycle of the respective one of the wheels, the third reference position differing from the second reference position by a third angle.

5. The system as claimed in claim 4, wherein said control device associates said detecting devices respectively with said wheel speed sensors further according to the third angle.

6. The system as claimed in claim 4, wherein the first angle is identical to the third angle.

7. The system as claimed in claim 1, wherein each of said detecting devices includes a tire pressure detector for detecting a tire pressure of the corresponding one of the wheels, and the detecting signal includes data of the tire pressure.

8. The system as claimed in claim 1, wherein the angular positions of any two of said detecting devices in the common coordinate system of the wheels differ from each other by an angle that is different from the first angle.

9. The system as claimed in claim 1, wherein the second angle is different from the first angle.

10. The system as claimed in claim 1, wherein, said detecting devices are assigned different device identifications, respectively, and for each of said detecting devices, the detecting signal emitted thereby includes the device identification that is assigned to said detecting device.

11. The system as claimed in claim 1, wherein the reference line is a geoid-based vertical line.

12. A method for locating wheels of a vehicle, each of the wheels including a toothed ring, the toothed rings of the wheels having respective reference teeth that are disposed respectively at different angular positions in a common coordinate system, the method to be implemented by a system including a plurality of detecting devices secured respectively on the wheels at respective different angular positions in the common coordinate system so that each of the detecting devices is co-rotatable with the respective one of the wheels, a plurality of wheel speed sensors assigned respectively to the wheels, and a control device communicatively coupled to the detecting devices and the wheel speed sensors, the method comprising steps of:

by each of the detecting devices, during a rotation cycle of the respective one of the wheels, emitting a detecting signal when the detecting device is disposed at a first reference position that is defined relative to a reference line and emitting the detecting signal when the detecting device is disposed at a second reference position that is defined relative to the reference line and that differs from the first reference position by a first angle, wherein the first reference position where the detecting device emits the detecting signal during a current rotation cycle of the respective one of the wheels differs from the first reference position where the detecting device emits the detecting signal during a next rotation cycle of the respective one of the wheels by a second angle;

sensing, by each of the wheel speed sensors, the toothed ring of the respective one of the wheels;

emitting, by each of the wheel speed sensors, a tooth number signal that indicates an ordinal number of a tooth of the toothed ring that is currently sensed by the wheel speed sensor counting from the reference tooth of the toothed ring of the respective one of the wheels;

receiving, by the control device, the detecting signals respectively from the detecting devices and the tooth number signals respectively from the wheel speed sensors;

analyzing, by the control device, the detecting signals and the tooth number signals to associate the detecting devices respectively with the wheel speed sensors; and for each of the detecting devices, identifying, by the control device, one of the wheels, to which one of the wheel speed sensors the detecting device is associated with is assigned, as one of the wheels to which the detecting device is secured.

13. The method as claimed in claim 12, wherein the step of analyzing the detecting signals and the tooth number signals includes, for each of the wheel speed sensors:

upon receiving each of the detecting signals, obtaining the ordinal number from a current one of the tooth number signals that is currently received from the wheel speed sensor;

calculating a difference between the ordinal number obtained from the current one of the tooth number signals and the ordinal number obtained from a previous one of the tooth number signals that is received from the wheel speed sensor prior to the current one of the tooth number signals;

when the difference is equal to a reference teeth number, determining that two of the detecting signals, which were respectively received simultaneously with the current one of the tooth number signals and the previous one of the tooth number signals, were emitted by a same one of the detecting devices; and associating said one of the detecting devices that emitted said two of the detecting signals with the wheel speed sensor.

14. The method as claimed in claim 13, wherein the reference teeth number is equal to a quotient of a product of the first angle and a total number of teeth of the toothed ring divided by 360 when the ordinal number obtained from the current one of the tooth number signals is smaller than the total number of teeth by at least the quotient, and is equal to a difference of the total number of teeth minus the quotient when otherwise.

15. The method as claimed in claim 14, further comprising a step of emitting, by each of the detecting devices, the detecting signal when the detecting device is disposed at a third reference position that is defined relative to the reference line during the rotation cycle of the respective one of the wheels, the third reference differing from the second reference position by a third angle.

16. The method as claimed in claim 15, wherein, in the step of analyzing the detecting signals and the tooth number signals, the control device associates the detecting devices respectively with the wheel speed sensors further according to the third angle.

17. The method as claimed in claim 15, wherein the first angle is identical to the third angle.

18. The method as claimed in claim 12, further comprising a step of detecting, by each of the detecting devices, a tire pressure of the respective one of the wheels, wherein the step of emitting a detecting signal is to emit the detecting signal to include data of the tire pressure.

19. The method as claimed in claim 12, wherein the reference line is a geoid-based vertical line.

20. The method as claimed in claim 12, said detecting devices being assigned different device identifications, respectively, wherein in the step of emitting a detecting signal by each of the detecting devices, the detecting signal includes the device identification that is assigned to the detecting device.

* * * * *